(12) United States Patent
Ichikawa

(10) Patent No.: US 9,263,917 B2
(45) Date of Patent: Feb. 16, 2016

(54) NON-CONTACT POWER RECEIVING APPARATUS, NON-CONTACT POWER TRANSMITTING APPARATUS, AND NON-CONTACT POWER TRANSMITTING AND RECEIVING SYSTEM

(75) Inventor: Shinji Ichikawa, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 136 days.

(21) Appl. No.: 13/885,020

(22) PCT Filed: Jun. 20, 2011

(86) PCT No.: PCT/JP2011/064054
§ 371 (c)(1),
(2), (4) Date: May 13, 2013

(87) PCT Pub. No.: WO2012/176265
PCT Pub. Date: Dec. 27, 2012

(65) Prior Publication Data
US 2014/0092243 A1 Apr. 3, 2014

(51) Int. Cl.
*H02J 7/00* (2006.01)
*H02J 17/00* (2006.01)
(Continued)

(52) U.S. Cl.
CPC . *H02J 17/00* (2013.01); *B60L 7/14* (2013.01); *B60L 11/123* (2013.01); *B60L 11/14* (2013.01); *B60L 11/182* (2013.01); *B60L 11/1829* (2013.01); *B60L 11/1833* (2013.01); *B60L 11/1835* (2013.01); *B60L 11/1861* (2013.01); *B60L 11/1877* (2013.01); *H02J 5/005* (2013.01); *H04N 7/18* (2013.01); *B60L 2210/10* (2013.01); *B60L 2210/30* (2013.01); *B60L 2210/40* (2013.01); *B60L 2220/14* (2013.01); *B60L 2230/16* (2013.01); *B60L 2240/662* (2013.01);

(Continued)

(58) Field of Classification Search
CPC ........ H02J 7/025; H01F 38/14; Y02T 90/122; B60L 11/182; Y02E 60/12
USPC .......................................... 320/108
See application file for complete search history.

(56) References Cited

U.S. PATENT DOCUMENTS

| | | | |
|---|---|---|---|
| 5,654,621 A * | 8/1997 | Seelig | 320/108 |
| 7,741,734 B2 | 6/2010 | Joannopoulos et al. | |
| 2007/0014439 A1* | 1/2007 | Ando | 382/118 |
| 2007/0222542 A1 | 9/2007 | Joannopoulos et al. | |
| 2008/0278264 A1 | 11/2008 | Karalis et al. | |

(Continued)

FOREIGN PATENT DOCUMENTS

| | | |
|---|---|---|
| AU | 2006269374 B2 | 1/2007 |
| AU | 2006269374 C1 | 1/2007 |

(Continued)

*Primary Examiner* — Arun Williams
(74) *Attorney, Agent, or Firm* — Oliff PLC

(57) ABSTRACT

A non-contact power receiving apparatus includes a power reception unit for receiving electric power in a non-contact manner from a power transmitting apparatus external to a vehicle, and a control device for controlling the transmitted power from the power transmitting apparatus. The control device controls the transmitted power based on a monitoring result obtained by monitoring the surroundings of the vehicle, and an occupant detection result obtained by detecting whether or not an occupant enters the vehicle. When the monitoring result indicates the approach of a moving object to the vehicle, the control device causes the power transmitting apparatus to reduce the transmitted power. The power transmitting apparatus and the power reception unit transmit and receive electric power in a non-contact manner by electromagnetic field resonance.

13 Claims, 14 Drawing Sheets

(51) Int. Cl.

| | | |
|---|---|---|
| *B60L 11/18* | (2006.01) | |
| *B60L 7/14* | (2006.01) | |
| *B60L 11/12* | (2006.01) | |
| *B60L 11/14* | (2006.01) | |
| *H04N 7/18* | (2006.01) | |
| *H02J 5/00* | (2006.01) | |
| *H02J 7/02* | (2006.01) | |

(52) U.S. Cl.
CPC .......... *B60L 2240/80* (2013.01); *B60L 2250/22* (2013.01); *H02J 7/025* (2013.01); *Y02T 10/6217* (2013.01); *Y02T 10/705* (2013.01); *Y02T 10/7005* (2013.01); *Y02T 10/7044* (2013.01); *Y02T 10/7077* (2013.01); *Y02T 10/7088* (2013.01); *Y02T 10/7216* (2013.01); *Y02T 10/7241* (2013.01); *Y02T 10/7291* (2013.01); *Y02T 90/121* (2013.01); *Y02T 90/122* (2013.01); *Y02T 90/125* (2013.01); *Y02T 90/127* (2013.01); *Y02T 90/128* (2013.01); *Y02T 90/14* (2013.01); *Y02T 90/16* (2013.01); *Y02T 90/163* (2013.01)

(56) References Cited

U.S. PATENT DOCUMENTS

| | | |
|---|---|---|
| 2009/0195332 A1 | 8/2009 | Joannopoulos et al. |
| 2009/0195333 A1 | 8/2009 | Joannopoulos et al. |
| 2009/0224856 A1 | 9/2009 | Karalis et al. |
| 2009/0267709 A1 | 10/2009 | Joannopoulos et al. |
| 2009/0267710 A1 | 10/2009 | Joannopoulos et al. |
| 2010/0096934 A1 | 4/2010 | Joannopoulos et al. |
| 2010/0102639 A1 | 4/2010 | Joannopoulos et al. |
| 2010/0102640 A1 | 4/2010 | Joannopoulos et al. |
| 2010/0102641 A1 | 4/2010 | Joannopoulos et al. |
| 2010/0117455 A1 | 5/2010 | Joannopoulos et al. |
| 2010/0117456 A1 | 5/2010 | Karalis et al. |
| 2010/0123353 A1 | 5/2010 | Joannopoulos et al. |
| 2010/0123354 A1 | 5/2010 | Joannopoulos et al. |
| 2010/0123355 A1 | 5/2010 | Joannopoulos et al. |
| 2010/0127573 A1 | 5/2010 | Joannopoulos et al. |
| 2010/0127574 A1 | 5/2010 | Joannopoulos et al. |
| 2010/0127575 A1 | 5/2010 | Joannopoulos et al. |
| 2010/0133918 A1 | 6/2010 | Joannopoulos et al. |
| 2010/0133919 A1 | 6/2010 | Joannopoulos et al. |
| 2010/0133920 A1 | 6/2010 | Joannopoulos et al. |
| 2010/0171370 A1 | 7/2010 | Karalis et al. |
| 2010/0181844 A1 | 7/2010 | Karalis et al. |
| 2010/0187911 A1 | 7/2010 | Joannopoulos et al. |
| 2010/0201205 A1 | 8/2010 | Karalis et al. |
| 2010/0207458 A1 | 8/2010 | Joannopoulos et al. |
| 2010/0225175 A1 | 9/2010 | Karalis et al. |
| 2010/0231053 A1 | 9/2010 | Karalis et al. |
| 2010/0237706 A1 | 9/2010 | Karalis et al. |
| 2010/0237707 A1 | 9/2010 | Karalis et al. |
| 2010/0237708 A1 | 9/2010 | Karalis et al. |
| 2010/0253152 A1 | 10/2010 | Karalis et al. |
| 2010/0264745 A1 | 10/2010 | Karalis et al. |

FOREIGN PATENT DOCUMENTS

| | | |
|---|---|---|
| AU | 2007349874 A2 | 10/2008 |
| AU | 2010200044 A1 | 1/2010 |
| CA | 2 615 123 A1 | 1/2007 |
| CA | 2 682 284 A1 | 10/2008 |
| CN | 101258658 A | 9/2008 |
| CN | 101682216 A | 3/2010 |
| CN | 101716356 A | 6/2010 |
| CN | 101860089 A | 10/2010 |
| EP | 1 902 505 A2 | 3/2008 |
| EP | 2 130 287 A1 | 12/2009 |
| IN | 735/DELNP/2008 | 5/2008 |
| IN | 6195/DELNP/2009 | 7/2010 |
| JP | A-2007-267578 | 10/2007 |
| JP | A-2009-501510 | 1/2009 |
| JP | A-2010-140451 | 6/2010 |
| JP | A-2010-252498 | 11/2010 |
| KR | 2008-0031398 A | 4/2008 |
| KR | 2010-0015954 A | 2/2010 |
| WO | WO 2007/008646 A2 | 1/2007 |
| WO | WO 2008/118178 A1 | 10/2008 |

* cited by examiner

NON-CONTACT POWER RECEIVING APPARATUS, NON-CONTACT POWER TRANSMITTING APPARATUS, AND NON-CONTACT POWER TRANSMITTING AND RECEIVING SYSTEM

TECHNICAL FIELD

The present invention relates to a non-contact power receiving apparatus, a non-contact power transmitting apparatus, and a non-contact power transmitting and receiving system.

BACKGROUND ART

In order to reduce emissions of carbon dioxide gas as a way to address global warming, there has been increasing development of vehicles configured such that a vehicle-mounted power storage device can be charged from outside, such as electric vehicles and plug-in hybrid vehicles.

Japanese Patent Laying-Open No. 2010-140451 (Patent Literature 1) discloses monitoring the approach of an object by a sonar with regard to a charging device for a vehicle-mounted battery in a plug-in hybrid vehicle and an electric vehicle. When an object comes within a prescribed distance, this technique generates a warning signal, gives an audio warning with a horn or a light warning with illumination, starts recording image information from a camera, and communicates with a set mobile network through a vehicle-mounted communication device.

CITATION LIST

Patent Literature

PTL 1: Japanese Patent Laying-Open No. 2010-140451
PTL 2: Japanese Patent Laying-Open No. 2007-267578

SUMMARY OF INVENTION

Technical Problem

The above Japanese Patent Laying-Open No. 2010-140451 discusses a plug-in system, and gives no specific discussion of charging control utilizing a surroundings monitoring system and a foreign object sensing system in a non-contact power feed system.

In a non-contact power feed system, electric power is transmitted using an electromagnetic field and the like. Although a non-contact power feed system is designed in such a manner that it does not affect communication equipment and the like during power transmission, it is preferable to further ensure that the equipment is not affected.

An object of the present invention is to provide a non-contact power receiving apparatus, a non-contact power transmitting apparatus, and a non-contact power transmitting and receiving system, with reduced adverse effect on communication equipment and the like during non-contact power transmission and reception.

Solution to Problem

In summary, the present invention is directed to a non-contact power receiving apparatus including a power reception unit for receiving electric power in a non-contact manner from a power transmitting apparatus external to a vehicle, and a control device for controlling the transmitted power from the power transmitting apparatus. The control device controls the transmitted power based on a monitoring result obtained by monitoring the surroundings of the vehicle, and an occupant detection result obtained by detecting whether or not an occupant enters the vehicle.

Preferably, when the monitoring result indicates the approach of a moving object to the vehicle, the control device causes the power transmitting apparatus to reduce the transmitted power.

Preferably, the non-contact power receiving apparatus further includes a monitoring unit for monitoring a monitored region around the vehicle and outputting the monitoring result to the control device, and a vehicle entry detection unit for detecting whether or not the occupant enters the vehicle. After the approach of the moving object to the vehicle is detected based on an output from the monitoring unit, when it is detected that the moving object has moved to a non-monitored region, the control device detects whether or not the occupant enters the vehicle with the vehicle entry detection unit.

More preferably, after the approach of the moving object to the vehicle is detected, when it is detected that the moving object has moved to the non-monitored region, the control device causes the power transmitting apparatus to continue power transmission if it is detected that the occupant has entered the vehicle, and causes the power transmitting apparatus to stop power transmission if it is not detected that the occupant has entered the vehicle.

More preferably, the monitoring unit is a camera for acquiring an image of the monitored region, a thermo camera for acquiring a temperature of the monitored region, or a monitoring device for detecting the presence or absence of the moving object in the monitored region by one of ultrasound, electric wave, light, and a variation in weight. The vehicle entry detection unit detects at least one of opening/closing of a door of the vehicle and a variation in weight of the vehicle.

More preferably, the power transmitting apparatus and the power reception unit transmit and receive electric power in a non-contact manner by electromagnetic field resonance.

In another aspect, the present invention is directed to a non-contact power transmitting apparatus including a power transmitting apparatus for transmitting electric power in a non-contact manner to a power reception unit of a vehicle, and a control device for controlling the transmitted power from the power transmitting apparatus. The control device controls the transmitted power based on a monitoring result obtained by monitoring the surroundings of the vehicle, and an occupant detection result obtained by detecting whether or not an occupant enters the vehicle.

Preferably, when the monitoring result indicates the approach of a moving object to the vehicle, the control device causes the power transmitting apparatus to reduce the transmitted power.

Preferably, the non-contact power transmitting apparatus further includes a monitoring unit for monitoring a monitored region around the vehicle and outputting the monitoring result to the control device. After the approach of the moving object to the vehicle is detected based on an output from the monitoring unit, when it is detected that the moving object has moved to a non-monitored region, the control device detects whether or not the occupant enters the vehicle with the monitoring unit.

More preferably, after the approach of the moving object to the vehicle is detected, when it is detected that the moving object has moved to the non-monitored region, the control device causes the power transmitting apparatus to continue power transmission if it is detected that the occupant has entered the vehicle, and causes the power transmitting apparatus to stop power transmission if it is not detected that the occupant has entered the vehicle.

More preferably, the monitoring unit is a camera for acquiring an image of the monitored region, a thereto camera for acquiring a temperature of the monitored region, or a monitoring device for detecting the presence or absence of the moving object in the monitored region by one of ultrasound, electric wave, light, and a variation in weight.

More preferably, the power transmitting apparatus and the power reception unit transmit and receive electric power in a non-contact manner by electromagnetic field resonance.

In still another aspect, the present invention is directed to a non-contact power transmitting and receiving system including a power transmitting apparatus external to a vehicle, a power reception unit mounted on the vehicle for receiving electric power in a non-contact manner from the power transmitting apparatus, and a control device for controlling the transmitted power from the power transmitting apparatus. The control device controls the transmitted power based on a monitoring result obtained by monitoring the surroundings of the vehicle, and an occupant detection result obtained by detecting whether or not an occupant enters the vehicle.

Preferably, when the monitoring result indicates the approach of a moving object to the vehicle, the control device causes the power transmitting apparatus to reduce the transmitted power.

Preferably, the power transmitting apparatus and the power reception unit transmit and receive electric power in a non-contact manner by electromagnetic field resonance.

Advantageous Effects of Invention

According to the present invention, the transmitted power for non-contact charging is reduced upon detection of the approach of a moving object, to avoid adverse effect on equipment and the like possessed by a person.

DESCRIPTION OF EMBODIMENTS

Figure 1:
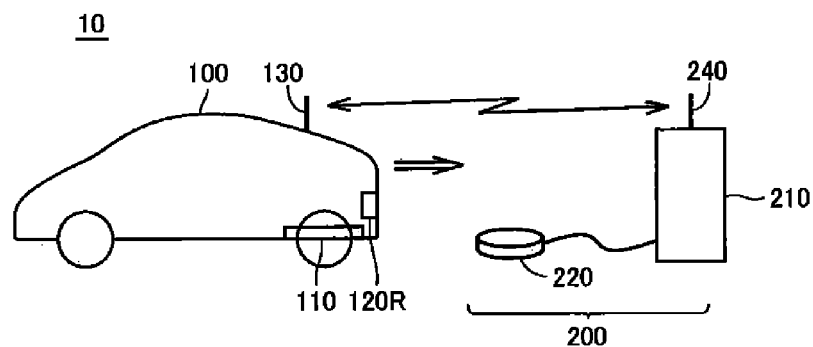
FIG. 1 is an overall configuration diagram of a vehicle power feed system according to an embodiment of the present invention.

The embodiments of the present invention will be hereinafter described in detail with reference to the drawings, in which the same or corresponding components are designated by the same reference characters, and description thereof will not be repeated.

First Embodiment

FIG. 1 is an overall configuration diagram of a vehicle power feed system according to an embodiment of the present invention.

Referring to FIG. 1, a non-contact power transmitting and receiving system 10 includes a vehicle 100 and a power transmitting apparatus 200. Vehicle 100 includes a power reception unit 110, a camera 120R and a communication unit 130.

Power reception unit 110 is installed underneath a vehicle body and configured to receive electric power from a power transmission unit 220 of power transmitting apparatus 200 in a non-contact manner. Specifically, power reception unit 110 includes a self-resonant coil described later which resonates with a self-resonant coil provided in power transmission unit 220 through an electromagnetic field for receiving electric power from power transmission unit 220 in a non-contact manner. Camera 120R is attached to the vehicle body so as to allow camera 120R to capture an image of the scene behind the vehicle. Communication unit 130 serves as a communication interface for establishing communication between vehicle 100 and power transmitting apparatus 200.

Power transmitting apparatus 200 includes a high-frequency power supply device 210, power transmission unit 220 and a communication unit 240. For example, high-frequency power supply device 210 converts commercial AC power supplied from a system power supply to high-frequency electric power, and outputs the power to power transmission unit 220. It is to be noted that the frequency of the high-frequency electric power generated by high-frequency power supply device 210 is, for example, 1 MHz to several tens of MHz.

Power transmission unit 220 is fixed onto the floor of a parking space and configured such that the high-frequency electric power supplied from high-frequency power supply device 210 is transmitted to power reception unit 110 of vehicle 100 in a non-contact manner. Specifically, power transmission unit 220 includes a self-resonant coil which resonates with the self-resonant coil included in power reception unit 110 through the electromagnetic field for transmitting the electric power to power reception unit 110 in a non-contact manner. Communication unit 240 serves as a communication interface for establishing communication between power transmitting apparatus 200 and vehicle 100.

In the above-described non-contact power transmitting and receiving system 10, the high-frequency electric power is supplied from power transmission unit 220 of power transmitting apparatus 200, and the self-resonant coil included in power reception unit 110 of vehicle 100 and the self-resonant coil included in power transmission unit 220 resonate with each other through the electromagnetic field, which causes power transmitting apparatus 200 to feed the electric power to vehicle 100.

The non-contact power feed method used for non-contact power transmitting and receiving system 10 according to this embodiment will then be described. In non-contact power transmitting and receiving system 10 according to this embodiment, resonance is used to feed the electric power from power transmitting apparatus 200 to vehicle 100.

Figure 2:
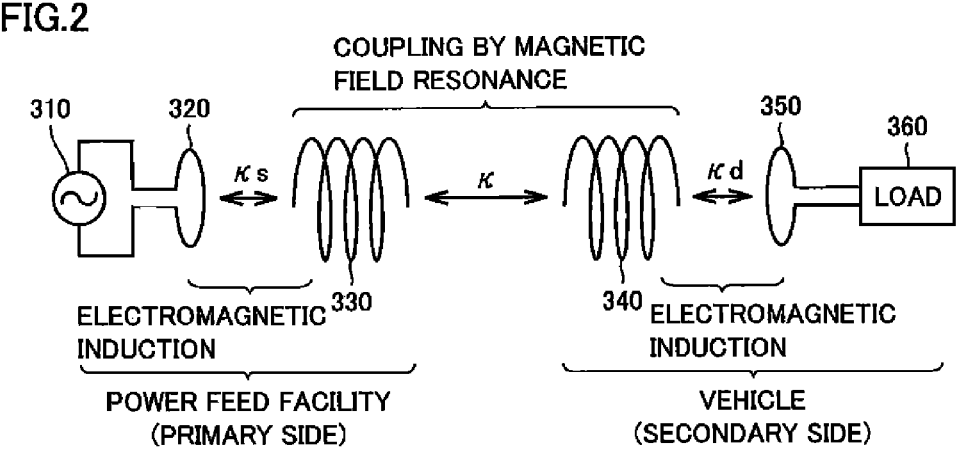
FIG. 2 is a diagram for illustrating the principle of power transmission by resonance.

FIG. 2 is a diagram for illustrating the principle of power transmission by resonance.

Referring to FIG. 2, according to this resonance, as in the case where two tuning forks resonate with each other, two LC resonant coils having the same natural frequency resonate with each other in an electromagnetic field (near field), which causes electric power to be transmitted from one of the coils to the other coil through the electromagnetic field.

Specifically, a primary coil 320 is connected to a high-frequency power supply 310 to feed electric power having a high-frequency of 1 M to several tens of MHz to a primary self-resonant coil 330 magnetically coupled to primary coil 320 by electromagnetic induction. Primary self-resonant coil 330 is an LC resonator consisting of an inductance of the coil itself and a stray capacitance, and resonates through an electromagnetic field (near field) with a secondary self-resonant coil 340 having the same resonance frequency as that of primary self-resonant coil 330. This causes the energy (electric power) to be transferred from primary self-resonant coil 330 through the electromagnetic field to secondary self-resonant coil 340. The energy (electric power) transferred to secondary self-resonant coil 340 is extracted by a secondary coil 350 magnetically coupled to secondary self-resonant coil 340 by electromagnetic induction, and supplied to a load 360. It is to be noted that the power transmission by resonance is implemented when a Q value showing the intensity of resonance between primary self-resonant coil 330 and secondary self-resonant coil 340 is greater than, for example, 100.

As compared to FIG. 1, secondary self-resonant coil 340 and secondary coil 350 correspond to power reception unit 110 in FIG. 1, and primary coil 320 and primary self-resonant coil 330 correspond to power transmission unit 220 in FIG. 1.

Figure 3:
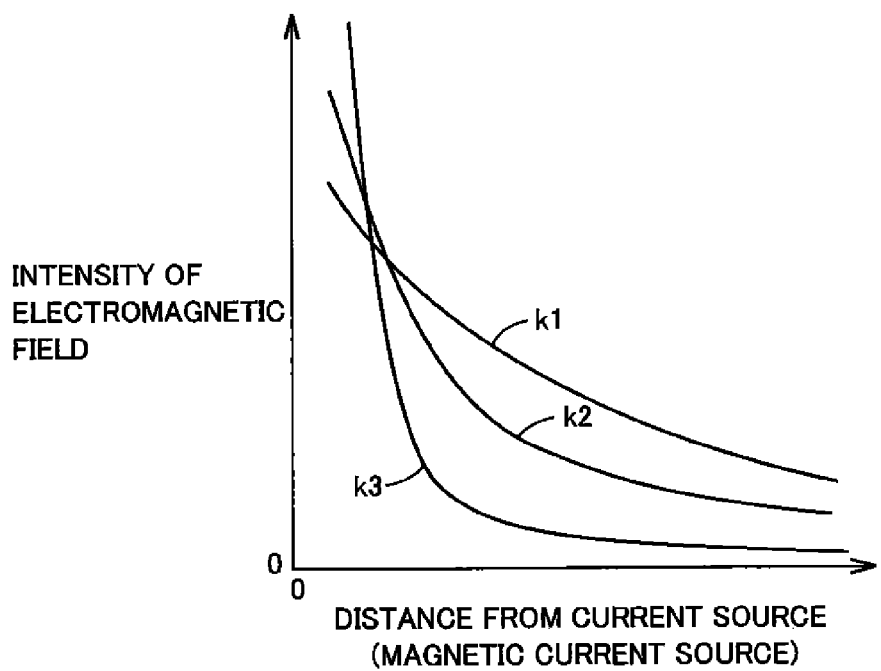
FIG. 3 is a diagram showing relation between the distance from a current source (magnetic current source) and the intensity of an electromagnetic field.

FIG. 3 is a diagram showing relation between the distance from a current source (magnetic current source) and the intensity of an electromagnetic field.

Referring to FIG. 3, the electromagnetic field includes three components. A curve k1 represents a component inversely proportional to the distance from the wave source and is referred to as a "radiation electromagnetic field." A curve k2 represents a component inversely proportional to the square of the distance from the wave source and is referred to as an "induction electromagnetic field." Furthermore, a curve k3 represents a component inversely proportional to the cube of the distance from the wave source and is referred to as an "electrostatic magnetic field."

Among others, there is a region where the intensity of electromagnetic wave sharply decreases in accordance with the distance from the wave source. In resonance, this near field (evanescent field) is used to transmit energy (electric power). In other words, the near field is used to cause resonance between a pair of resonators (for example, a pair of LC resonant coils) having the same natural frequency, to thereby transmit the energy (electric power) from one of the resonators (primary self-resonant coil) to the other resonator (secondary self-resonant coil). This near field does not allow propagation of the energy (electric power) over a long distance. Accordingly, as compared to the electromagnetic wave carrying the energy (electric power) by the "radiation electromagnetic field" allowing propagation of the energy over a long distance, resonance allows power transmission with reduced energy loss.

Figure 4:
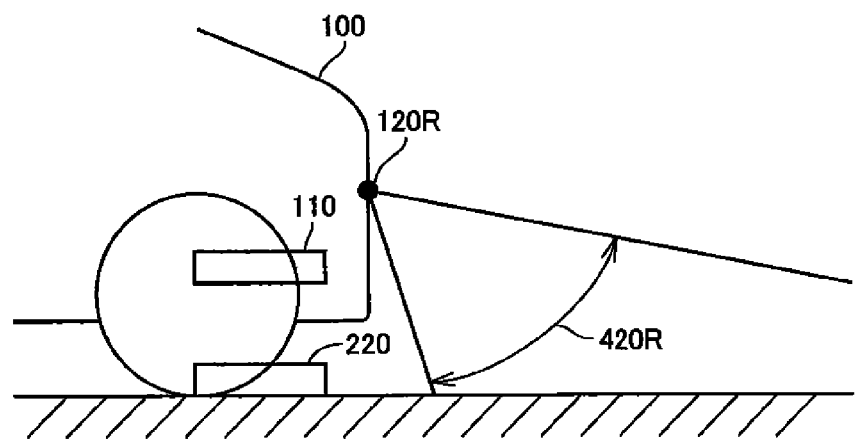
FIG. 4 is a diagram for illustrating positional relation between a camera 120S, a power reception unit 110 and a power transmission unit 220 shown in FIG. 1 while charging is performed.

FIG. 4 is a diagram for illustrating positional relation between camera 120R, power reception unit 110 and power transmission unit 220 shown in FIG. 1 while charging is performed.

Referring to FIG. 4, position adjustment is made while the charging is performed, which results in a small position mismatch between power transmission unit 220 and power reception unit 110. Although not necessarily limited, the parking position is preferably adjusted so that power reception unit 110 is located immediately above power transmission unit 220.

Camera 120R monitors the surroundings of the vehicle while the charging is performed. The approach of a moving object to the vehicle can be detected by camera 120R. Camera 120R monitors the area of a monitored region 420R. In addition to camera 120R for capturing an image of the scene behind the vehicle shown in FIG. 1, a plurality of cameras for monitoring the scenes ahead of, and on the right and left sides of the vehicle are provided on the vehicle. These plurality of cameras are responsible for their own monitored regions, respectively, so that the presence or absence of a moving object around the vehicle can be monitored by all of the plurality of cameras.

A portion in close proximity to and almost in contact with the vehicle body, and a portion between the bottom of the vehicle and the ground are blind spots to camera 120R. When a moving object has moved out of the frame of the monitored area, it can be determined whether the object has entered the vehicle or entered the blind spot in the monitored area, based on the opening/closing of a door or a variation in vehicle weight.

Figure 5:
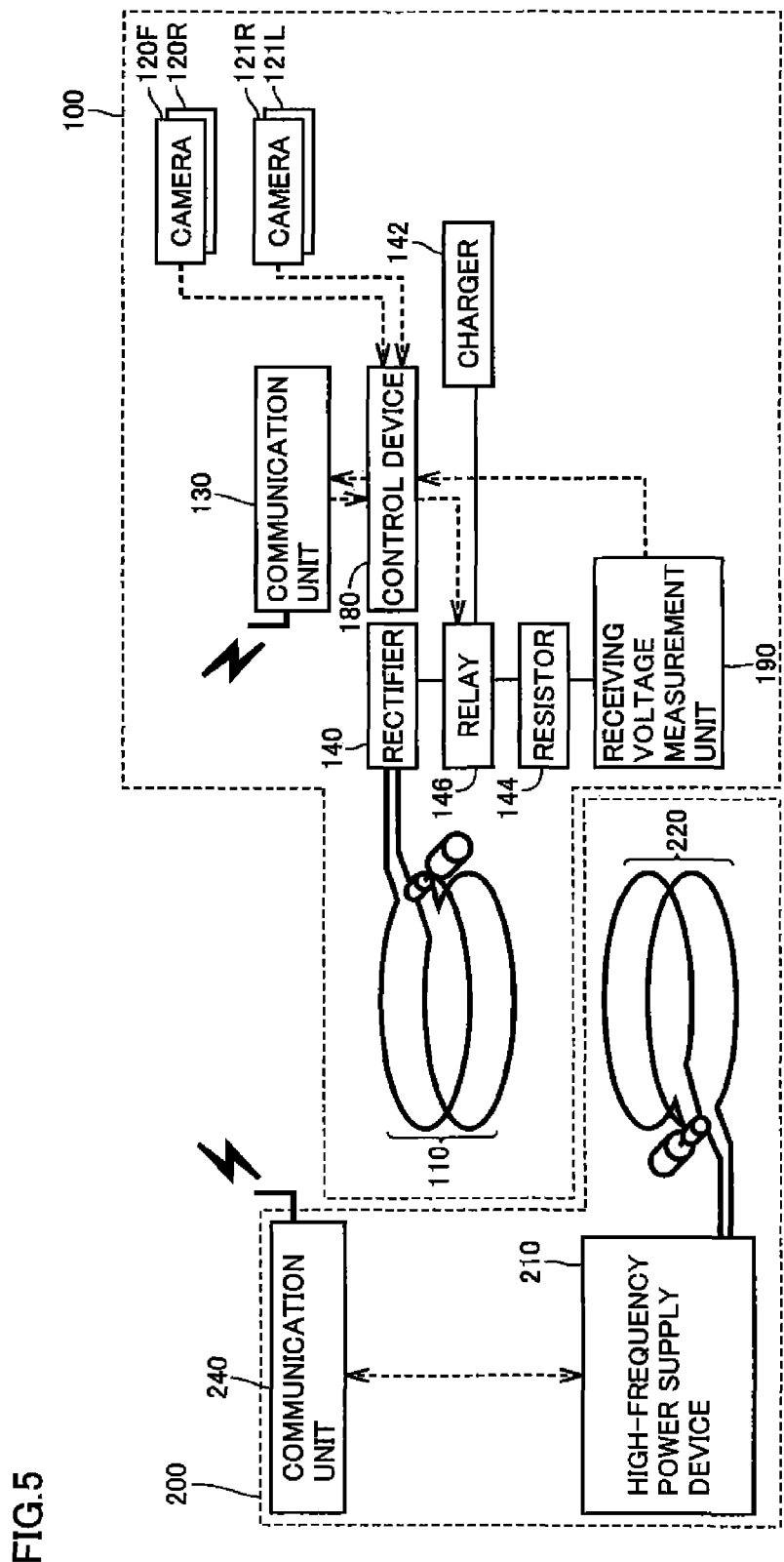
FIG. 5 is a diagram showing a general configuration with regard to power transmission and reception between a vehicle and a power feed apparatus illustrated in a first embodiment.

FIG. 5 is a diagram showing a general configuration with regard to power transmission and reception between the vehicle and the power feed apparatus illustrated in the first embodiment.

Referring to FIG. 5, power transmitting apparatus 200 includes power transmission unit 220, high-frequency power supply device 210 and communication unit 240.

Vehicle 100 includes communication unit 130, power reception unit 110, a rectifier 140, a relay 146, a resistor 144, a receiving voltage measurement unit (voltage sensor) 190, a charger (DC/DC converter) 142 for charging a power storage device, cameras 120F, 120R for monitoring the scenes ahead of and behind the vehicle, cameras 121R, 121L for monitoring the scenes on the right and left sides of the vehicle, and a control device 180.

Communication unit 240 and communication unit 130 communicate wirelessly with each other to exchange information for making the position adjustment between power reception unit 110 and power transmission unit 220. By temporarily connecting resistor 144 via relay 146 to the output of the power transmission unit, receiving voltage measurement unit 190 can obtain voltage information that indicates whether or not a receiving power condition is satisfied. A power transmission request of weak electric power for obtaining this voltage information is transmitted through communication units 130, 240 from vehicle 100 to power transmitting apparatus 200. Upon completion of the position adjustment, relay 146 is controlled such that it is rendered OFF so that resistor 144 does not affect the power reception. Practical power transmission is then performed.

Figure 6:
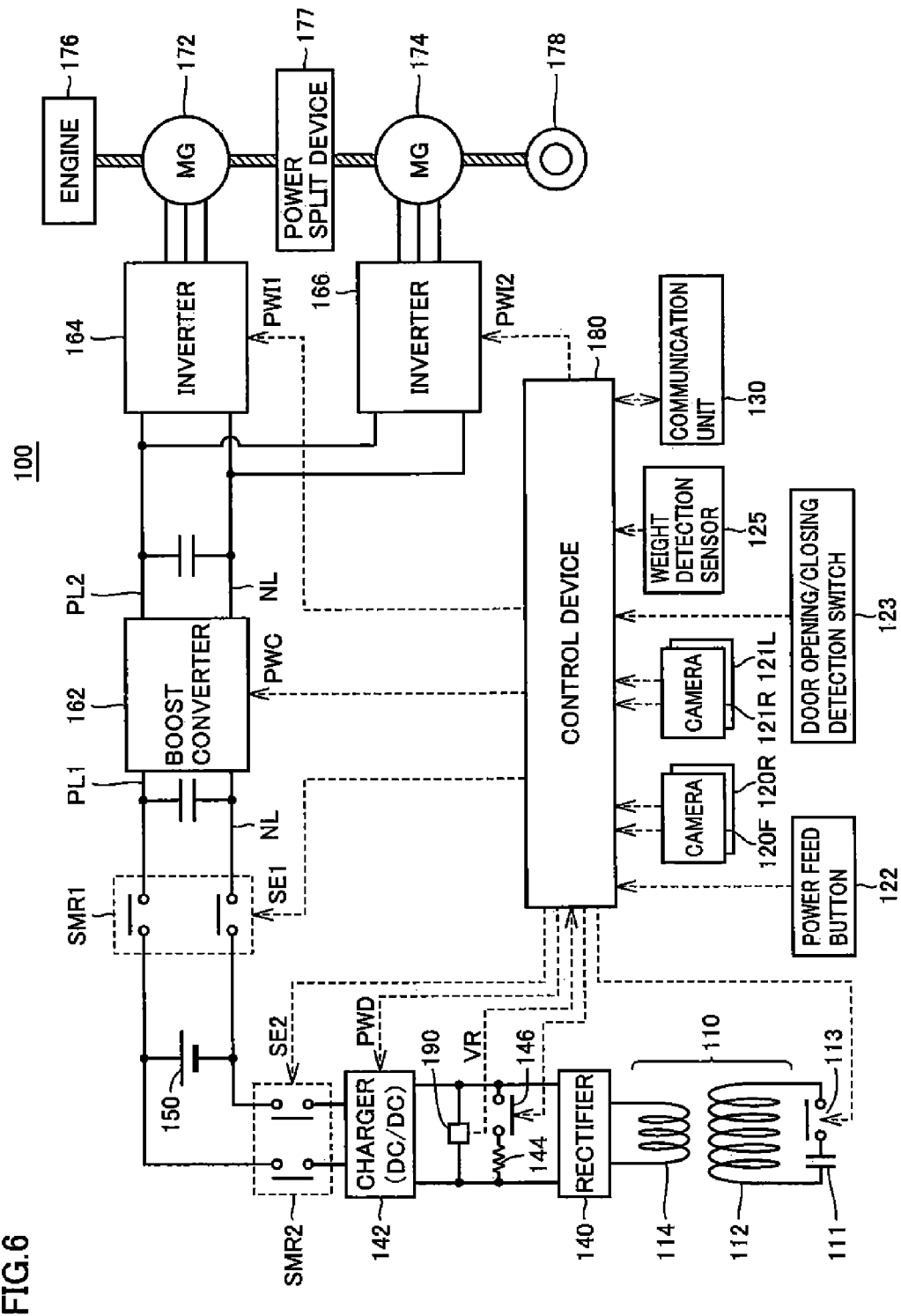
FIG. 6 is a configuration diagram showing the details of a vehicle 100 shown in FIGS. 1 and 5.

FIG. 6 is a configuration diagram showing the details of vehicle 100 shown in FIGS. 1 and 5.

Referring to FIG. 6, vehicle 100 includes a power storage device 150, a system main relay SMR1, a boost converter 162, inverters 164, 166, motor generators 172, 174, an engine 176, a power split device 177, and a drive wheel 178.

Vehicle 100 further includes a secondary self-resonant coil 112, a secondary coil 114, rectifier 140, DC/DC converter 142, a system main relay SMR2, and voltage sensor 190.

Vehicle 100 further includes control device 180, cameras 120F, 120R for monitoring the scenes ahead of and behind the vehicle, cameras 121R, 121L for monitoring the scenes on the right and left sides of the vehicle, a door opening/closing detection switch 123, a weight detection sensor 125 for detecting the vehicle weight, communication unit 130, and a power feed button 122.

Vehicle 100 is equipped with engine 176 and motor generator 174 as a power source. Engine 176 and motor generators 172, 174 are coupled to power split device 177. Vehicle 100 runs with driving power generated by at least one of engine 176 and motor generator 174. The power generated by engine 176 is split by power split device 177 into two paths including a path through which the power is transmitted to drive wheel 178 and a path through which the power is transmitted to motor generator 172.

Motor generator 172 is an AC rotating electric machine including, for example, a three-phase AC synchronous electric motor provided with a rotor into which a permanent magnet is incorporated. Motor generator 172 generates electric power using kinetic energy of engine 176 split by power split device 177. For example, when the state of charge (also referred to as "SOC") of power storage device 150 becomes lower than a predetermined value, engine 176 is started and motor generator 172 generates electric power, to charge power storage device 150.

Motor generator 174 is also an AC rotating electric machine including, for example, a three-phase AC synchronous electric motor provided with a rotor into which a permanent magnet is incorporated, as with motor generator 172. Motor generator 174 generates driving force using at least one of the electric power stored in power storage device 150 and the electric power generated by motor generator 172. The driving force of motor generator 174 is then transmitted to drive wheel 178.

Furthermore, during braking of the vehicle and during reduction in acceleration on a downwardly sloping surface, the dynamic energy stored in the vehicle as kinetic energy and potential energy is used for rotary drive of motor generator 174 through drive wheel 178, to cause motor generator 174 to operate as a power generator. Consequently, motor generator 174 operates as a regenerative brake for converting the driving energy into electric power to generate braking force. The electric power generated by motor generator 174 is then stored in power storage device 150.

Power split device 177 can use a planetary gear including a sun gear, pinion gears, a carrier, and a ring gear. The pinion gears engage with the sun gear and the ring gear. The carrier is coupled to the crankshaft of engine 176 while rotatably supporting the pinion gears. The sun gear is coupled to the rotation shaft of motor generator 172. The ring gear is coupled to the rotation shaft of motor generator 174 and drive wheel 178.

Power storage device 150 serves as a rechargeable DC power supply including, for example, a secondary battery such as lithium-ion or nickel-metal hydride secondary battery. Power storage device 150 stores the electric power supplied from DC/DC converter 142, and also stores the regenerative electric power generated by motor generators 172, 174. Power storage device 150 then supplies the stored electric power to boost converter 162. It is to be noted that a large-capacity capacitor may also be employed as power storage device 150 and any power buffer may be used that can temporarily store the electric power supplied from power transmitting apparatus 200 (FIG. 1) and the regenerative electric power from motor generators 172, 174, to supply the stored electric power to boost converter 162.

System main relay SMR1 is disposed between power storage device 150 and boost converter 162. System main relay SMR1 electrically connects power storage device 150 to boost converter 162 when a signal SE1 from control device 180 is activated, and interrupts the electric path between power storage device 150 and boost converter 162 when signal SE1 is deactivated. Based on a signal PWC from control device 180, boost converter 162 boosts the voltage on a positive electrode line PL2 to a voltage greater than or equal to the voltage output from power storage device 150. It is to be noted that boost converter 162 includes, for example, a DC chopper circuit.

Inverters 164, 166 are provided corresponding to motor generators 172, 174, respectively. Inverter 164 drives motor generator 172 based on a signal PWI1 from control device 180, and inverter 166 drives motor generator 174 based on a signal PWI2 from control device 180. It is to be noted that inverters 164, 166 include, for example, a three-phase bridge circuit.

Secondary self-resonant coil 112 has both ends connected to capacitor 111 through a switch (relay 113), and resonates with the primary resonant coil of power transmitting apparatus 200 through the electromagnetic field when the switch (relay 113) is rendered conductive. This resonance causes power transmitting apparatus 200 to supply the electric power. While FIG. 6 shows an example in which capacitor 111 is provided, adjustment with respect to the primary self-resonant coil may be made so as to achieve resonance by stray capacitance of the coil, in place of the capacitor.

With regard to secondary self-resonant coil 112, the number of its turns is appropriately set so as to increase the distance to the primary self-resonant coil of power transmitting apparatus 200, and a Q value (for example, Q>100) showing the intensity of resonance between the primary self-resonant coil and secondary self-resonant coil 112, and to reduce κ showing the degree of coupling therebetween.

Secondary coil 114 is provided coaxially with secondary self-resonant coil 112 and can be magnetically coupled to secondary self-resonant coil 112 by electromagnetic induction. This secondary coil 114 extracts, by electromagnetic induction, the electric power supplied from secondary self-resonant coil 112 and outputs the electric power to rectifier 140. It is to be noted that secondary self-resonant coil 112 and secondary coil 114 form power reception unit 110 shown in FIG. 1.

Rectifier 140 rectifies the AC power extracted by secondary coil 114. Based on a signal PWD from control device 180, DC/DC converter 142 converts the electric power rectified by rectifier 140 into the voltage level of power storage device 150, and outputs the resultant to power storage device 150.

System main relay SMR2 is disposed between DC/DC converter 142 and power storage device 150. When a signal SE2 from control device 180 is activated, system main relay SMR2 electrically connects power storage device 150 to DC/DC converter 142. When signal SE2 is deactivated, system main relay. SMR2 interrupts the electric path between power storage device 150 and DC/DC converter 142. Voltage sensor 190 detects a voltage VR between rectifier 140 and DC/DC converter 142, and outputs the detected value to control device 180.

Resistor 144 and relay 146 which are connected in series are provided between rectifier 140 and DC/DC converter 142. Relay 146 is controlled by control device 180 such that it is rendered conductive when the position of vehicle 100 is adjusted during non-contact power feed.

Based on the accelerator pedal position, the vehicle speed and the signals from various sensors, control device 180 generates signals PWC, PWI1, PWI2 for driving boost converter 162 and motor generators 172, 174, respectively. Control device 180 outputs generated signals PWC, PWI1, PWI2 to boost converter 162 and inverters 164, 166, respectively. During the vehicle running, control device 180 activates signal SE1 to cause system main relay SMR1 to be turned on, and deactivates signal SE2 to cause system main relay SMR2 to be turned off.

Weak electric power can be transmitted before the transmission of large electric power for charging, to determine a receiving power state based on voltage VR. Accordingly, the driver or the vehicle guidance system makes the position adjustment of the vehicle based on voltage VR.

Upon completion of the position adjustment of the vehicle, control device 180 transmits a power transmission command through communication unit 130 to power transmitting apparatus 200, and activates signal SE2 to cause system main relay SMR2 to be turned on. Then, control device 180 generates signal PWD for driving DC/DC converter 142 and outputs generated signal PWD to DC/DC converter 142.

Furthermore, while the electric power is being received from power transmitting apparatus 200, control device 180 causes cameras 120F, 120R for monitoring the scenes ahead of and behind the vehicle and cameras 121R, 121L for monitoring the scenes on the right and left sides of the vehicle to monitor the surroundings of the vehicle. It is to be noted that a monitoring device such as a sonar that detects the presence or absence of a moving object in the monitored region by one of ultrasound, electric wave and light may be used in place of the monitoring cameras. Moreover, the movement of a person and an animal can be monitored without illumination during the night by using infrared cameras as the monitoring cameras.

After the approach of a moving object to the vehicle is detected, when the moving object has moved to a non-monitored region, control device 180 determines whether the moving object has entered the vehicle or has moved to the blind spot in the monitored region by using outputs from door opening/closing detection switch 123 and weight detection sensor 125. Then, control device 180 causes power transmitting apparatus 200 to continue the power transmission if it is detected that an occupant has entered the vehicle, and causes power transmitting apparatus 200 to stop the power transmission if it is not detected that an occupant has entered the vehicle.

Figure 7:
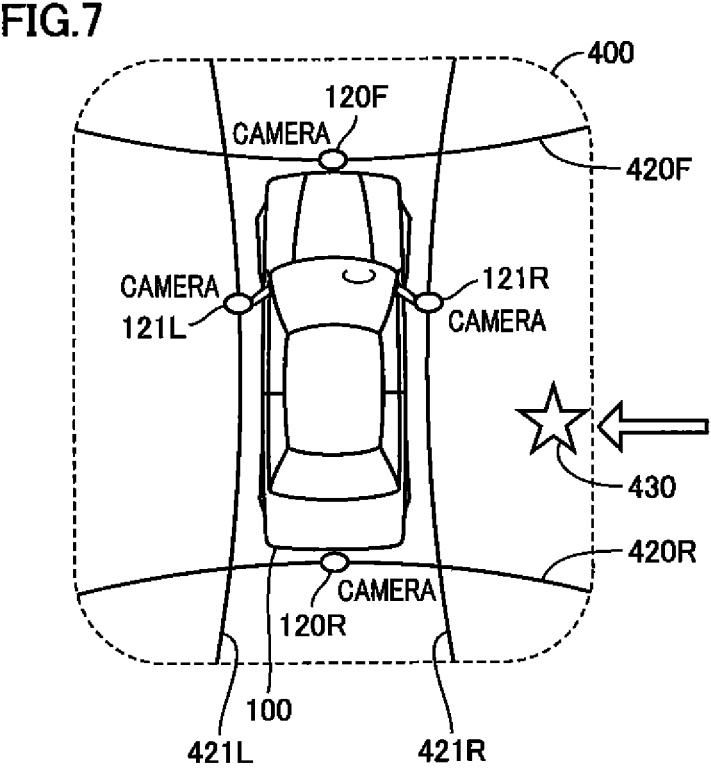
FIG. 7 is a diagram for illustrating regions monitored by cameras in the first embodiment.

FIG. 7 is a diagram for illustrating regions monitored by the cameras in the first embodiment.

Referring to FIG. 7, vehicle 100 includes cameras 120F, 120R for monitoring the scenes ahead of and behind the vehicle, and cameras 121R, 121L for monitoring the scenes on the right and left sides of the vehicle. A region monitored by camera 120F is a region 420F, and a region monitored by camera 120R is a region 420R. A region monitored by camera 121R is a region 421R, and a region monitored by camera 121L is a region 421L. A monitored region 400 around vehicle 100 is monitored by the four cameras.

When a moving object 430 enters monitored region 400, the entry and the direction of movement of the moving object can be recognized by taking the difference between images captured at intervals of a unit time.

Figure 8:
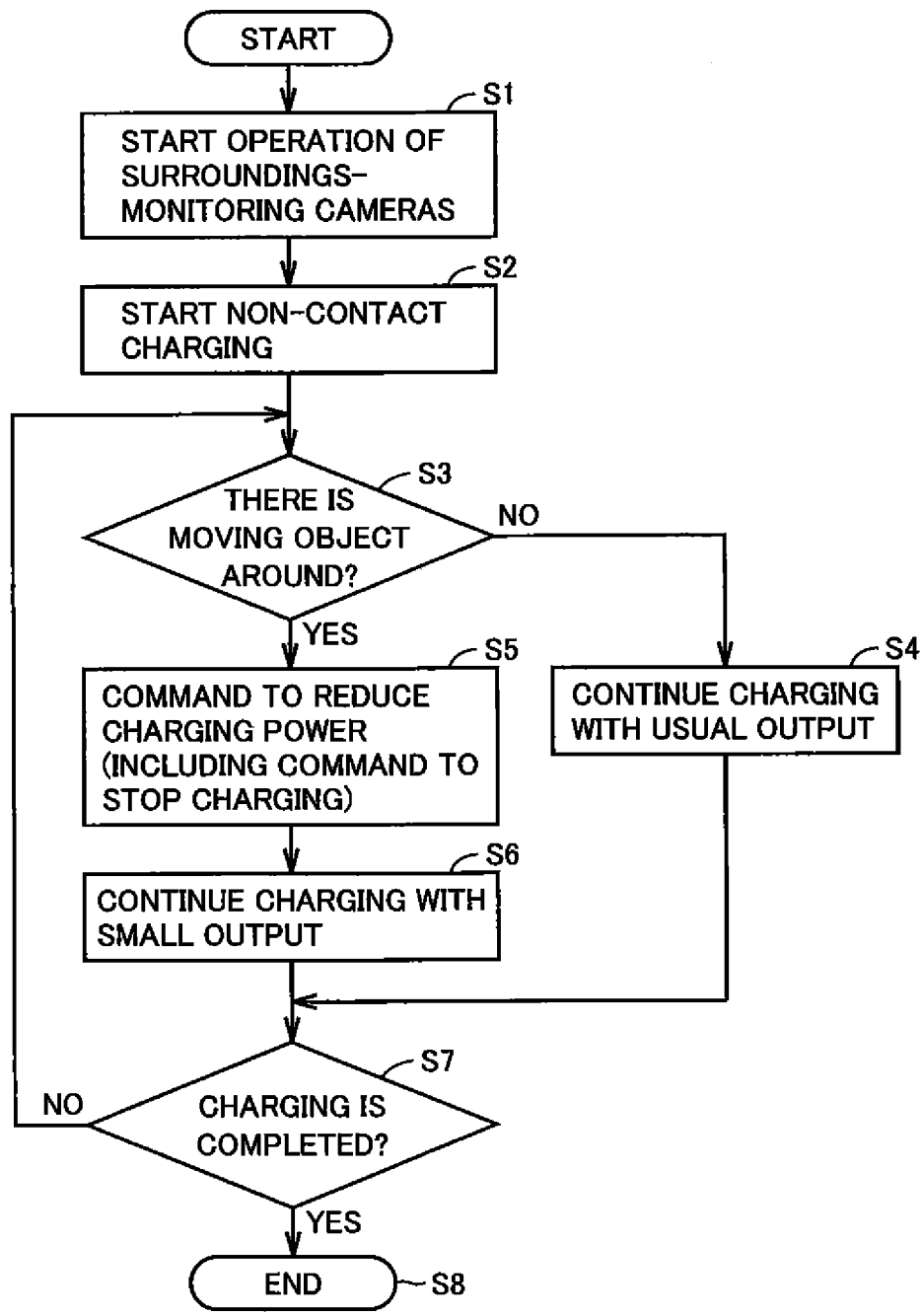
FIG. 8 is a flowchart for illustrating surroundings monitoring and power transmission control performed by a control device 180 shown in FIG. 6.

FIG. 8 is a flowchart for illustrating the surroundings monitoring and the power transmission control performed by control device 180 shown in FIG. 6.

Referring to FIGS. 6 and 8, first, when a charging process is started upon pushing of power feed button 122 and completion of the position adjustment, in step S1, control device 180 causes cameras 120F, 120R, 121R, 121L for monitoring the surroundings to start operation. Then, in step S2, non-contact charging is started. Then, in step S3, control device 180 determines whether or not there is a moving object around vehicle 100 by regularly acquiring images captured by cameras 120F, 120R, 121R, 121L and taking the difference between the images.

If it is determined in step S3 that there is no moving object, the process proceeds to step S4 where the charging with usual output is continued. If it is determined in step S3 that there is a moving object, on the other hand, the process proceeds to step S5.

In step S5, control device 180 transmits a command to reduce the charging power to power transmitting apparatus 200 through communication unit 130. This command may be a command to stop the charging. Then, in step S6, the charging with output of smaller electric power than that in step S4 is continued. If a command to stop the charging is transmitted, however, the charging in step S6 is not performed.

Following the processing in step S4 or step S6, in step S7, control device 180 determines whether or not the charging of power storage device 150 has been completed. This determination is made based on whether or not the state of charge SOC of power storage device 150 has reached a target value, whether or not a scheduled period of charging time has elapsed, and so on.

If it is determined in step S7 that the charging has been completed, the charging process ends in step S8. If the charging has not been completed, the process returns to step S3. In this case, the process proceeds to step S4 if the moving object is no longer detected around the vehicle, and the charging with usual output is resumed.

In this manner, according to this embodiment, when a moving object or the like is detected by the non-contact power transmitting and receiving system that monitors the surroundings during charging by operating the cameras attached to the front and rear as well both sides of the vehicle, a command to reduce (or stop) the transmitted power is transmitted to the power transmitting apparatus.

As a result, the approach of a moving object or the like to the vehicle can be sensed during charging, to reduce or stop the output appropriately.

First Modification of First Embodiment

Figure 9:
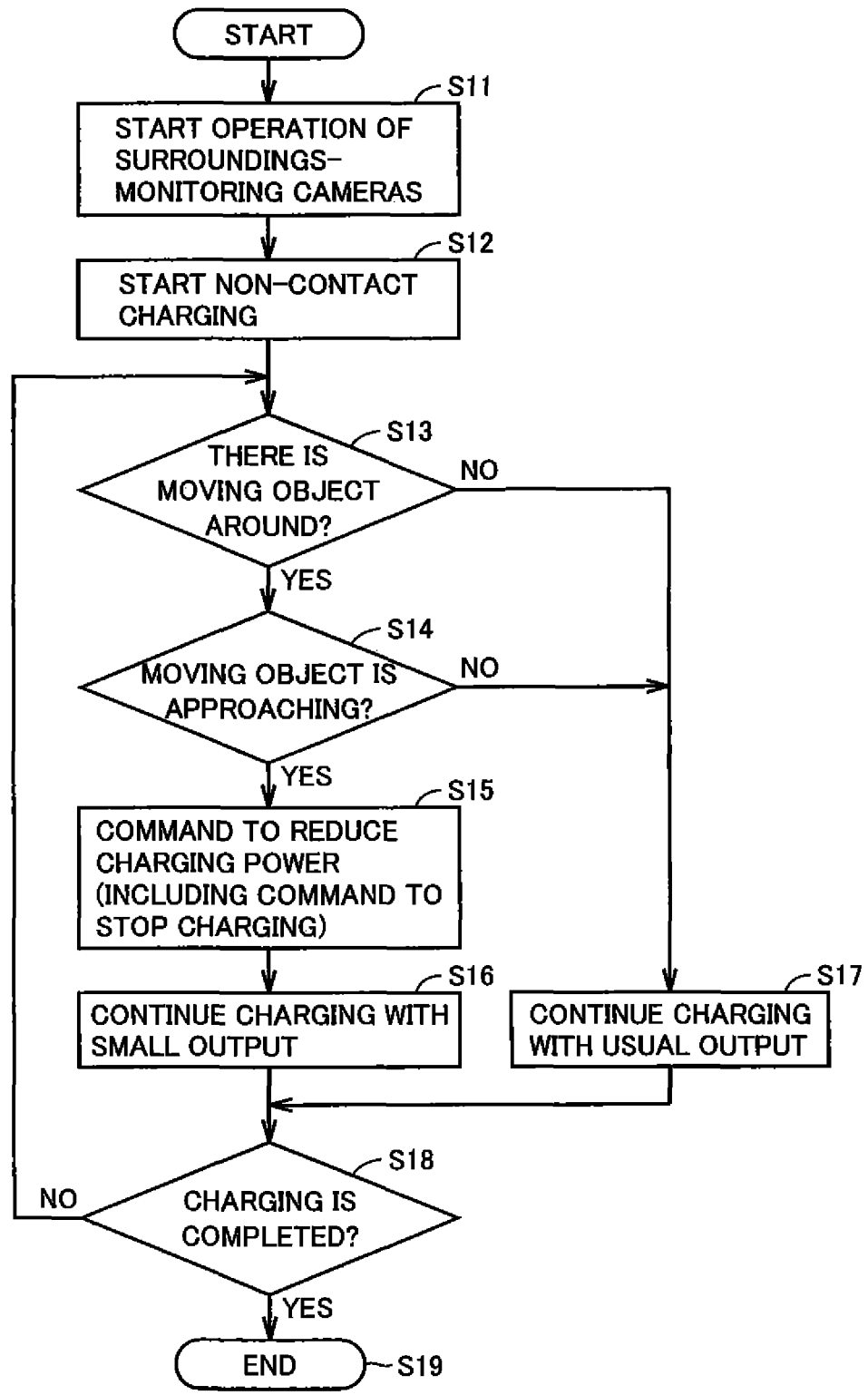
FIG. 9 is a flowchart for illustrating control performed in a first modification of the first embodiment.

FIG. 9 is a flowchart for illustrating control performed in a first modification of the first embodiment.

Referring to FIGS. 6 and 9, first, when a charging process is started upon pushing of power feed button 122 and completion of the position adjustment, in step S11, control device 180 causes cameras 120F, 120R, 121R, 121L for monitoring the surroundings to start operation. Then, in step S12, non-contact charging is started. Then, in step S13, control device 180 determines whether or not there is a moving object around vehicle 100 by regularly acquiring images captured by cameras 120F, 120R, 121R, 121L and taking the difference between the images.

If it is determined in step S13 that there is no moving object, the process proceeds to step S17 where the charging with usual output is continued. If it is determined in step S13 that there is a moving object, on the other hand, the process proceeds to step S14.

In step S14, control device 180 determines whether or not the moving object is approaching. The direction of movement of the moving object can be determined from the difference between the images. If the moving object is approaching, the size of the object detected from the difference gradually increases.

If it is determined in step S14 that the moving object is not approaching, the process proceeds to step S17 where the charging with usual output is continued. If it is determined in step S14 that the moving object is approaching, on the other hand, the process proceeds to step S15.

In step S15, control device 180 transmits a command to reduce the charging power to power transmitting apparatus 200 through communication unit 130. This command may be a command to stop the charging. Then, in step S16, the charging with output of smaller electric power than that in step S17 is continued. If a command to stop the charging is transmitted, however, the charging in step S16 is not performed.

Following the processing in step S16 or step S17, in step S18, control device 180 determines whether or not the charging of power storage device 150 has been completed. This determination is made based on whether or not the state of charge SOC of power storage device 150 has reached a target value, whether or not a scheduled period of charging time has elapsed, and so on.

If it is determined in step S18 that the charging has been completed, the charging process ends in step S19. If the charging has not been completed, the process returns to step S13. In this case, the process proceeds to step S17 if the moving object is no longer detected around the vehicle, and the charging with usual output is resumed.

In this manner, according to the first modification of the first embodiment, the transmitted power is reduced or stopped if the moving object is approaching, whereas the usual charging is performed if the moving object is moving away. Accordingly, the period of charging time is likely to be shortened in addition to the effect produced in the first embodiment.

Second Modification of First Embodiment

Figure 10:
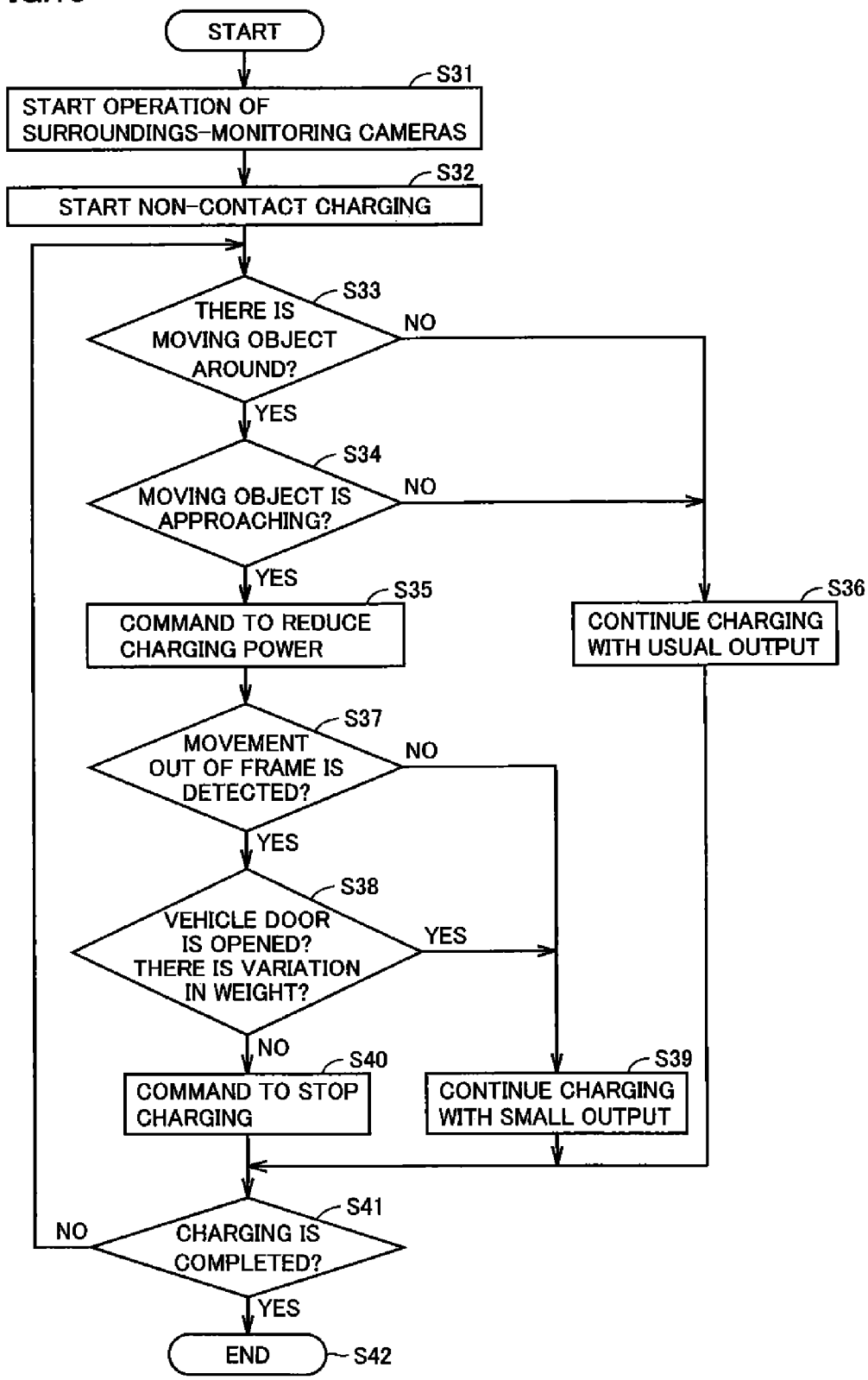
FIG. 10 is a flowchart for illustrating control performed in a second modification of the first embodiment.

FIG. 10 is a flowchart for illustrating control performed in a second modification of the first embodiment.

Referring to FIGS. 6 and 10, first, when a charging process is started upon pushing of power feed button 122 and completion of the position adjustment, in step S31, control device 180 causes cameras 120F, 120R, 121R, 121L for monitoring the surroundings to start operation. Then, in step S32, non-contact charging is started. Then, in step S33, control device 180 determines whether or not there is a moving object around vehicle 100 by regularly acquiring images captured by cameras 120F, 120R, 121R, 121L and taking the difference between the images.

If it is determined in step S33 that there is no moving object, the process proceeds to step S36 where the charging with usual output is continued. If it is determined in step S33 that there is a moving object, on the other hand, the process proceeds to step S34.

In step S34, control device 180 determines whether or not the moving object is approaching. The direction of movement of the moving object can be determined from the difference between the images. If the moving object is approaching, the size of the object detected from the difference gradually increases.

If it is determined in step S34 that the moving object is not approaching, the process proceeds to step S36 where the charging with usual output is continued. If it is determined in step S34 that the moving object is approaching, on the other hand, the process proceeds to step S35.

In step S35, control device 180 transmits a command to reduce the charging power to power transmitting apparatus 200 through communication unit 130. This command may be a command to stop the charging. Then, in step S37, control device 180 determines whether or not the moving object has moved out of the frame, that is, whether or not the moving object has disappeared from monitored region 400 shown in FIG. 7.

If it is detected in step S37 that the moving object has moved out of the frame, the process proceeds to step S38. If it is not detected that the moving object has moved out of the frame, the process proceeds to step S39.

In step S38, control device 180 determines one or both of: whether or not a vehicle door has been opened; and whether or not there has been a variation in vehicle weight. This determines whether or not the moving object that moved out of the frame has entered the interior of the vehicle. Whether or not a vehicle door has been opened can be determined based on an output from door opening/closing detection switch 123 which is provided on the vehicle door and operates in response to movement of a room lamp. Whether or not there has been a variation in vehicle weight can be determined based on an output from weight detection sensor 125 which is used for automatic adjustment of the hardness of a suspension of the vehicle and the like. An output from a seating sensor provided on a seat may be used in place of the output from weight detection sensor 125. Weight detection sensor 125 or the seating sensor can also be used as one of the monitoring devices.

If it is detected in step S38 that one or both of: a vehicle door has been opened; and there has been a variation in vehicle weight, the process proceeds to step S39. If neither is detected in step S38, on the other hand, the process proceeds to step S40. If the process proceeds to step S40, there is a possibility that the moving object has entered the blind spot in the monitored area, and thus control device 180 commands high-frequency power supply device 210 to stop the charging, by way of precaution. If the process proceeds to step S39, it is considered that the distance to power transmission unit 220 is still secured, and thus the charging with small output is continued.

Following the processing in step S36 or step S39 or step S40, in step S41, control device 180 determines whether or not the charging of power storage device 150 has been completed. This determination is made based on whether or not the state of charge SOC of power storage device 150 has reached a target value, whether or not a scheduled period of charging time has elapsed, and so on.

If it is determined in step S41 that the charging has been completed, the charging process ends in step S42. If the charging has not been completed, the process returns to step S33. In this case, the process proceeds to step S36 if the moving object is no longer detected around the vehicle, and the charging with usual output is resumed.

In this manner, according to the second modification of the first embodiment, the transmitted power is reduced if the moving object is approaching, whereas the usual charging is performed if the moving object is moving away. In addition, if there is a high possibility that the moving object has entered the blind spot in the monitored area, power transmitting apparatus 200 is caused to stop the power transmission by way of precaution. Accordingly, the period of charging time is likely to be shortened, and a possibility of adverse effect on equipment and the like due to the power transmission is further reduced, in addition to the effect produced in the first embodiment.

Second Embodiment

In the first embodiment, an example has been described where a moving object around the vehicle is monitored by the control device of the vehicle and the transmitted power from the power transmitting apparatus is controlled in the non-contact power transmitting and receiving system. Such monitoring of a moving object around the vehicle and control of the transmitted power from the power transmitting apparatus can also be carried out on the power transmitting apparatus side.

Figure 11:
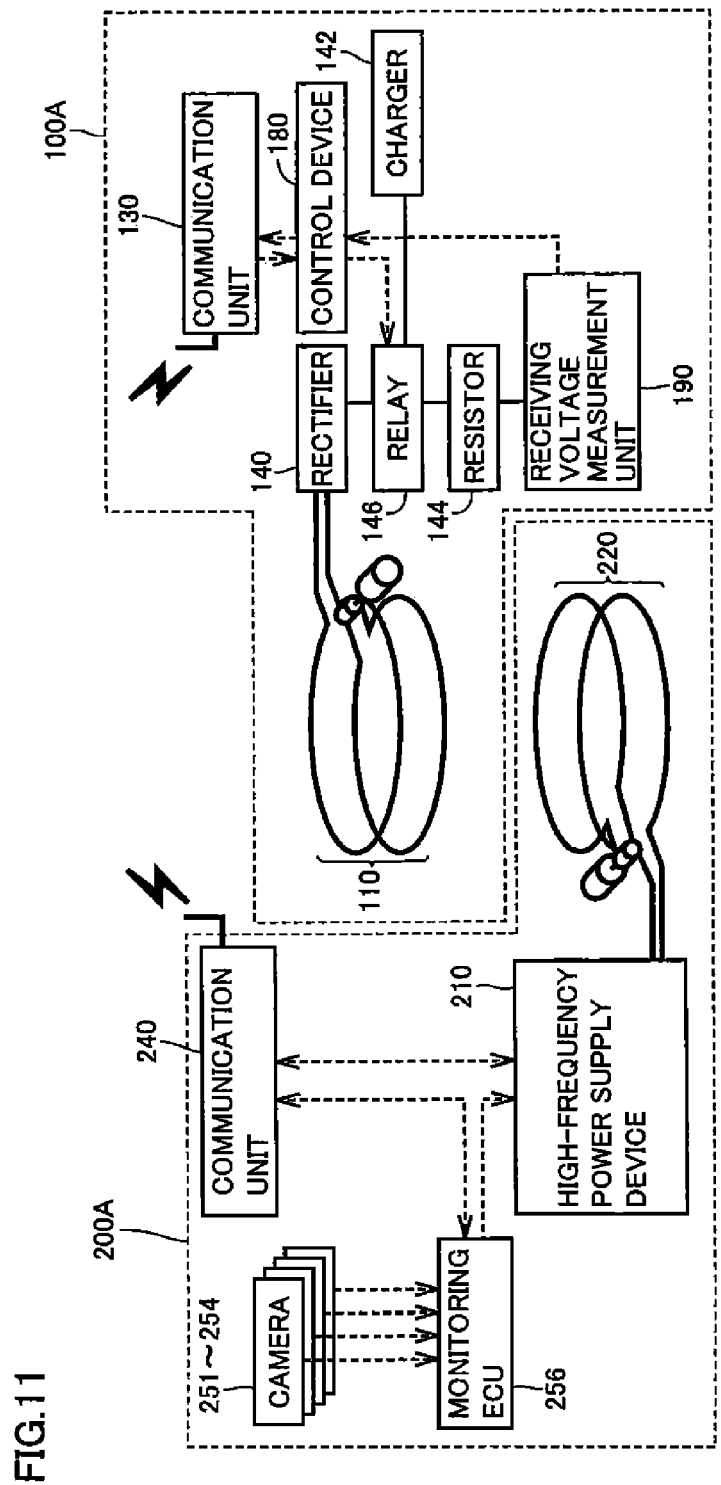
FIG. 11 is a diagram showing a general configuration with regard to power transmission and reception between a vehicle and a power feed apparatus illustrated in a second embodiment.

FIG. 11 is a diagram showing a general configuration with regard to power transmission and reception between a vehicle and a power feed apparatus illustrated in a second embodiment.

Referring to FIG. 11, a power transmitting apparatus 200A includes power transmission unit 220, high-frequency power supply device 210, communication unit 240, cameras 251 to 254 for monitoring the surroundings of the vehicle, and a monitoring ECU 256.

A vehicle 100A includes communication unit 130, power reception unit 110, rectifier 140, relay 146, resistor 144, receiving voltage measurement unit (voltage sensor) 190, charger 142 for charging the power storage device, and control device 180.

The configuration shown in FIG. 11 is different from the configuration shown in FIG. 5 in that vehicle 100A is not provided with cameras for monitoring the surroundings of the vehicle, but power transmitting apparatus 200A is instead provided with cameras 251 to 254 for monitoring the surroundings of the vehicle, and monitoring ECU 256 for controlling the transmitted power from high-frequency power supply device 210 based on the outputs from cameras 251 to 254.

Figure 12:
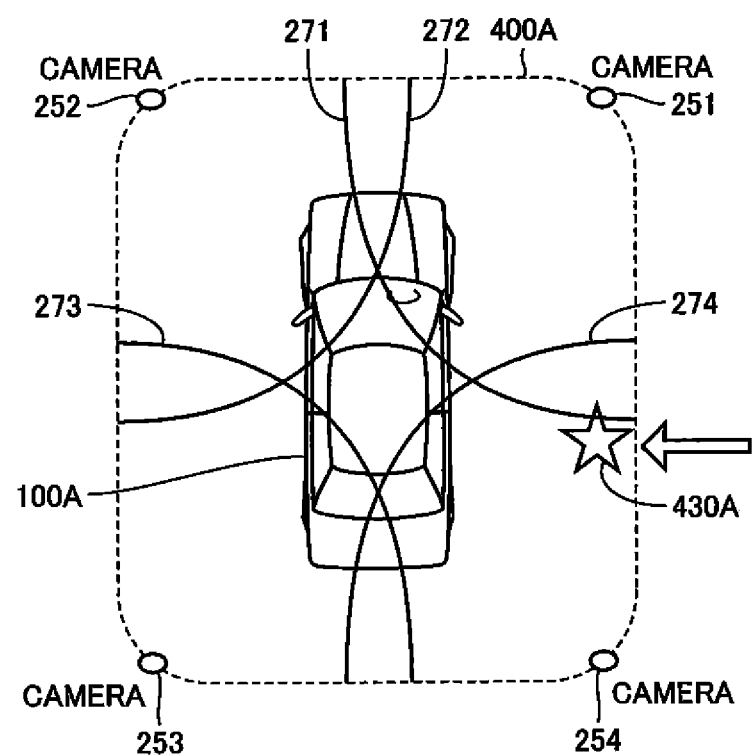
FIG. 12 is a diagram for illustrating regions monitored by cameras in the second embodiment.

FIG. 12 is a diagram for illustrating regions monitored by the cameras in the second embodiment.

Referring to FIG. 12, power transmitting apparatus 200A is provided with cameras 251 to 254 arranged at the four corners of the monitored region.

A region monitored by camera 251 is a region 271, and a region monitored by camera 252 is a region 272. A region monitored by camera 253 is a region 273, and a region monitored by camera 254 is a region 274. A monitored region 400A around vehicle 100A is monitored by the four cameras.

When a moving object 430A enters monitored region 400A, the entry and the direction of movement of the moving object can be recognized by taking the difference between images captured at intervals of a unit time.

While FIG. 12 shows an example where four cameras are provided, a single camera arranged on a ceiling may be used in the case where the parking space is provided with a ceiling of a certain height.

Figure 13:
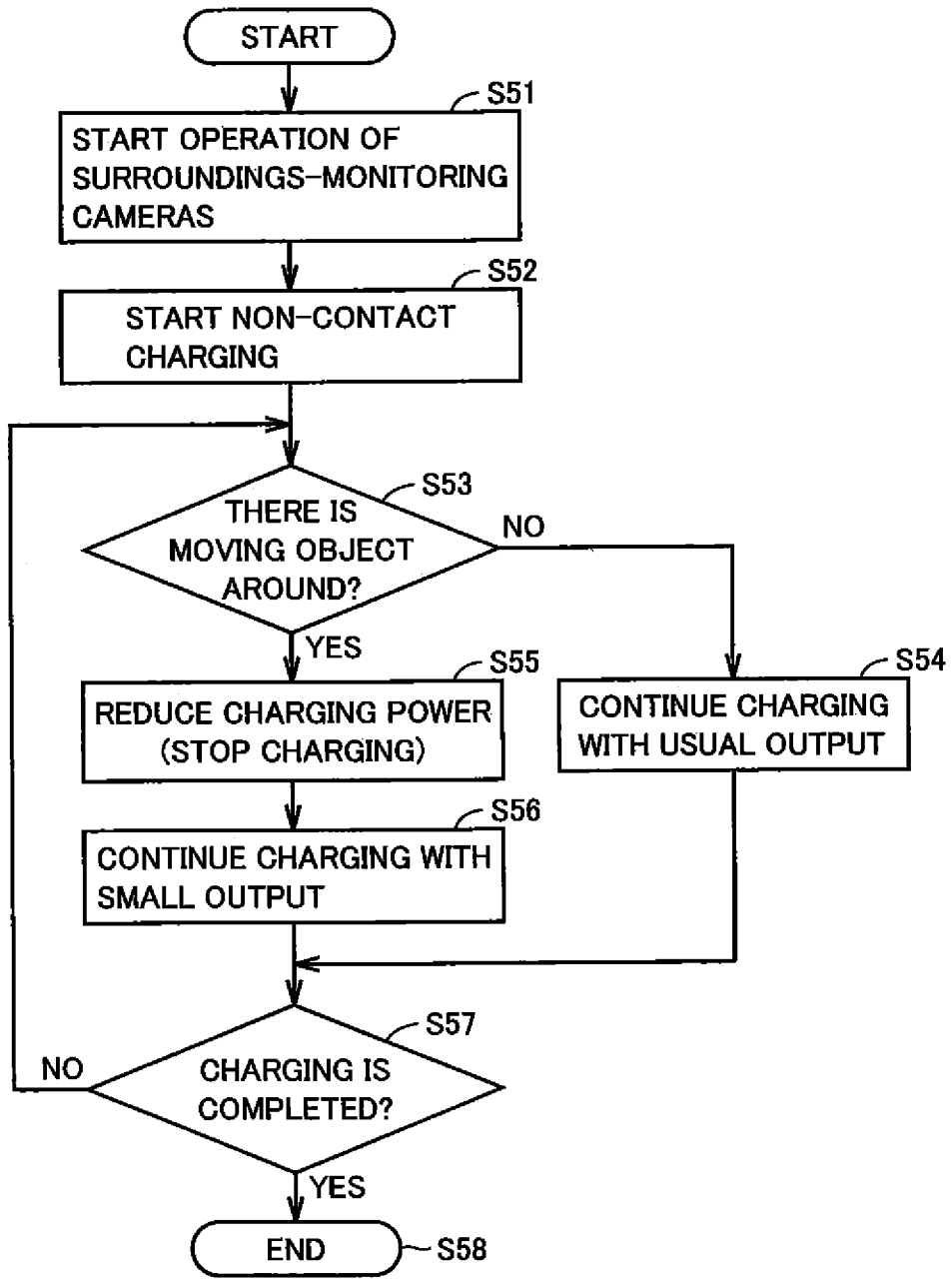
FIG. 13 is a flowchart for illustrating surroundings monitoring and power transmission control performed by a monitoring ECU 256 shown in FIG. 11.

FIG. 13 is a flowchart for illustrating the surroundings monitoring and the power transmission control performed by monitoring ECU 256 shown in FIG. 11.

Referring to FIGS. 11 and 13, first, when a charging process is started upon pushing of power feed button 122 of the vehicle shown in FIG. 6 and completion of the position adjustment, in step S51, monitoring ECU 256 causes cameras 251 to 254 for monitoring the surroundings to start operation. Then, in step S52, non-contact charging is started. Then, in step S53, monitoring ECU 256 determines whether or not there is a moving object around vehicle 100A by regularly acquiring images captured by cameras 251 to 254 and taking the difference between the images.

If it is determined in step S53 that there is no moving object, the process proceeds to step S54 where the charging with usual output is continued. If it is determined in step S53 that there is a moving object, on the other hand, the process proceeds to step S55.

In step S55, monitoring ECU 256 causes a reduction in charging power from power transmitting apparatus 200A. This reduction in charging power may be stopping of the charging. Then, in step S56, the charging with output of smaller electric power than that in step S54 is continued. If the charging is stopped, however, the charging in step S56 is not performed.

Following the processing in step S54 or step S56, in step S57, monitoring ECU 256 determines whether or not the charging of power storage device 150 has been completed. This determination is made based on information obtained from the vehicle through communication unit 240, such as information indicating whether or not the state of charge SOC of power storage device 150 has reached a target value, and information indicating whether or not a scheduled period of charging time has elapsed.

If it is determined in step S57 that the charging has been completed, the charging process ends in step S58. If the charging has not been completed, the process returns to step S53. In this case, the process proceeds to step S54 if the moving object is no longer detected around the vehicle, and the charging with usual output is resumed.

In this manner, according to the second embodiment, when a moving object or the like is detected by the non-contact power transmitting and receiving system that monitors the surroundings during charging by operating the cameras that are not mounted on the vehicle but are provided on the power transmitting apparatus side, the power transmitting apparatus is caused to reduce (or stop) the transmitted power.

As a result, the approach of a moving object or the like to the vehicle can be sensed during charging, to reduce or stop the output appropriately.

First Modification of Second Embodiment

Figure 14:
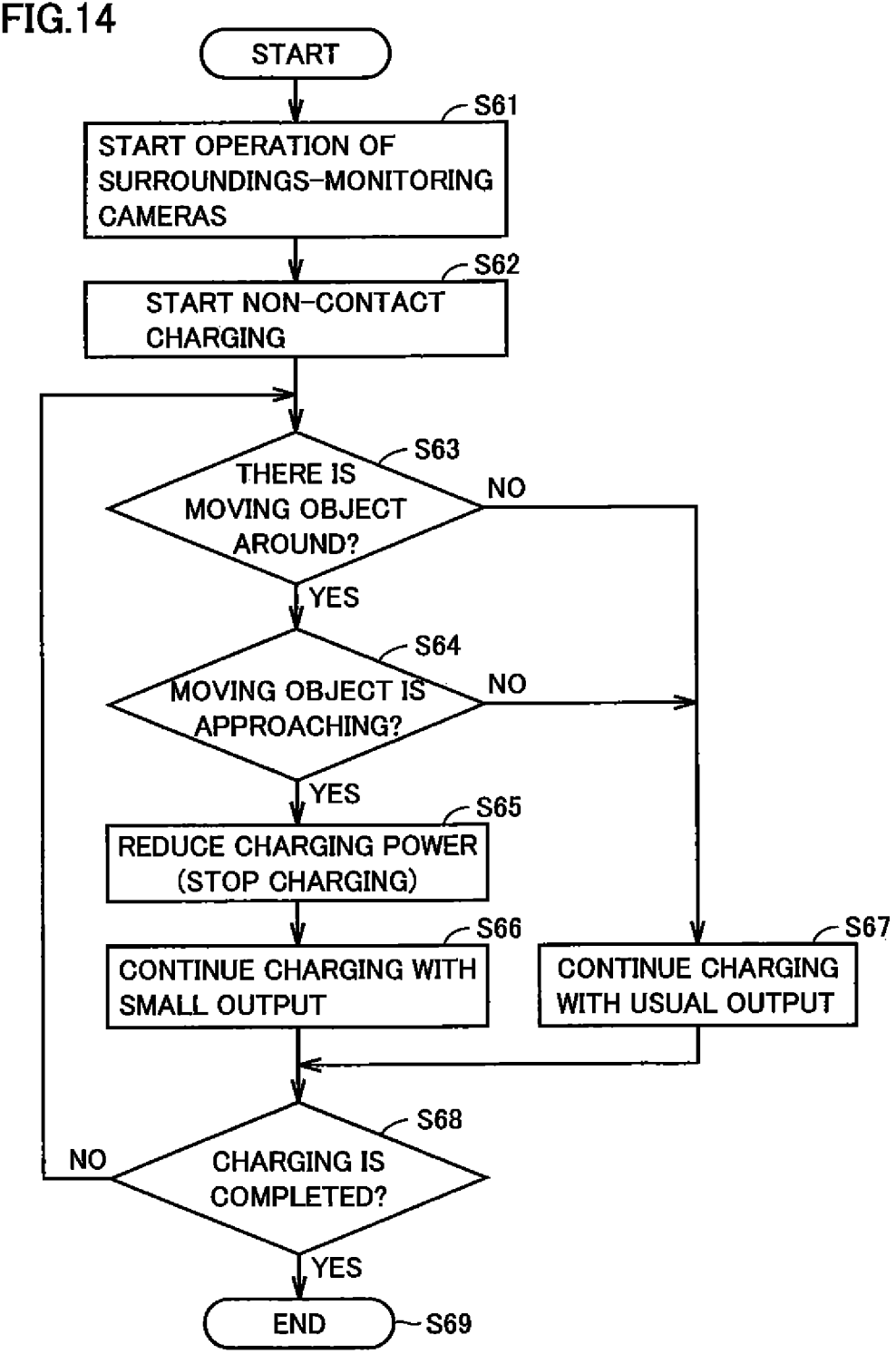
FIG. 14 is a flowchart for illustrating control performed in a first modification of the second embodiment.

FIG. 14 is a flowchart for illustrating control performed in a first modification of the second embodiment.

Referring to FIGS. 11 and 14, first, when a charging process is started upon pushing of power feed button 122 of the vehicle shown in FIG. 6 and completion of the position adjustment, in step S61, monitoring ECU 256 causes cameras 251 to 254 for monitoring the surroundings to start operation. Then, in step S62, non-contact charging is started. Then, in step S63, monitoring ECU 256 determines whether or not there is a moving object around vehicle 100A by regularly acquiring images captured by cameras 251 to 254 and taking the difference between the images.

If it is determined in step S63 that there is no moving object, the process proceeds to step S67 where the charging with usual output is continued. If it is determined in step S63 that there is a moving object, on the other hand, the process proceeds to step 64.

In step S64, monitoring ECU 256 determines whether or not the moving object is approaching. The direction of movement of the moving object can be determined from the difference between the images. If the moving object is approaching, the size of the object detected from the difference gradually increases.

If it is determined in step S64 that the moving object is not approaching, the process proceeds to step S67 where the charging with usual output is continued. If it is determined in step S64 that the moving object is approaching, on the other hand, the process proceeds to step S65.

In step S65, monitoring ECU 256 causes a reduction in charging power from power transmitting apparatus 200A. This reduction in charging power may be stopping of the charging. Then, in step S66, the charging with output of smaller electric power than that in step S67 is continued. If the charging is stopped, however, the charging in step S66 is not performed.

Following the processing in step S66 or step S67, in step S68, monitoring ECU 256 determines whether or not the charging of power storage device 150 has been completed. This determination is made based on information obtained through communication unit 240, such as information indicating whether or not the state of charge SOC of power storage device 150 has reached a target value, and information indicating whether or not a scheduled period of charging time has elapsed.

If it is determined in step S68 that the charging has been completed, the charging process ends in step S69. If the charging has not been completed, the process returns to step S63. In this case, the process proceeds to step S67 if the moving object is no longer detected around the vehicle, and the charging with usual output is resumed.

In this manner, according to the first modification of the second embodiment, the transmitted power is reduced or stopped if the moving object is approaching, whereas the usual charging is performed if the moving object is moving away. Accordingly, the period of charging time is likely to be shortened in addition to the effect produced in the second embodiment.

Second Modification of Second Embodiment

Figure 15:
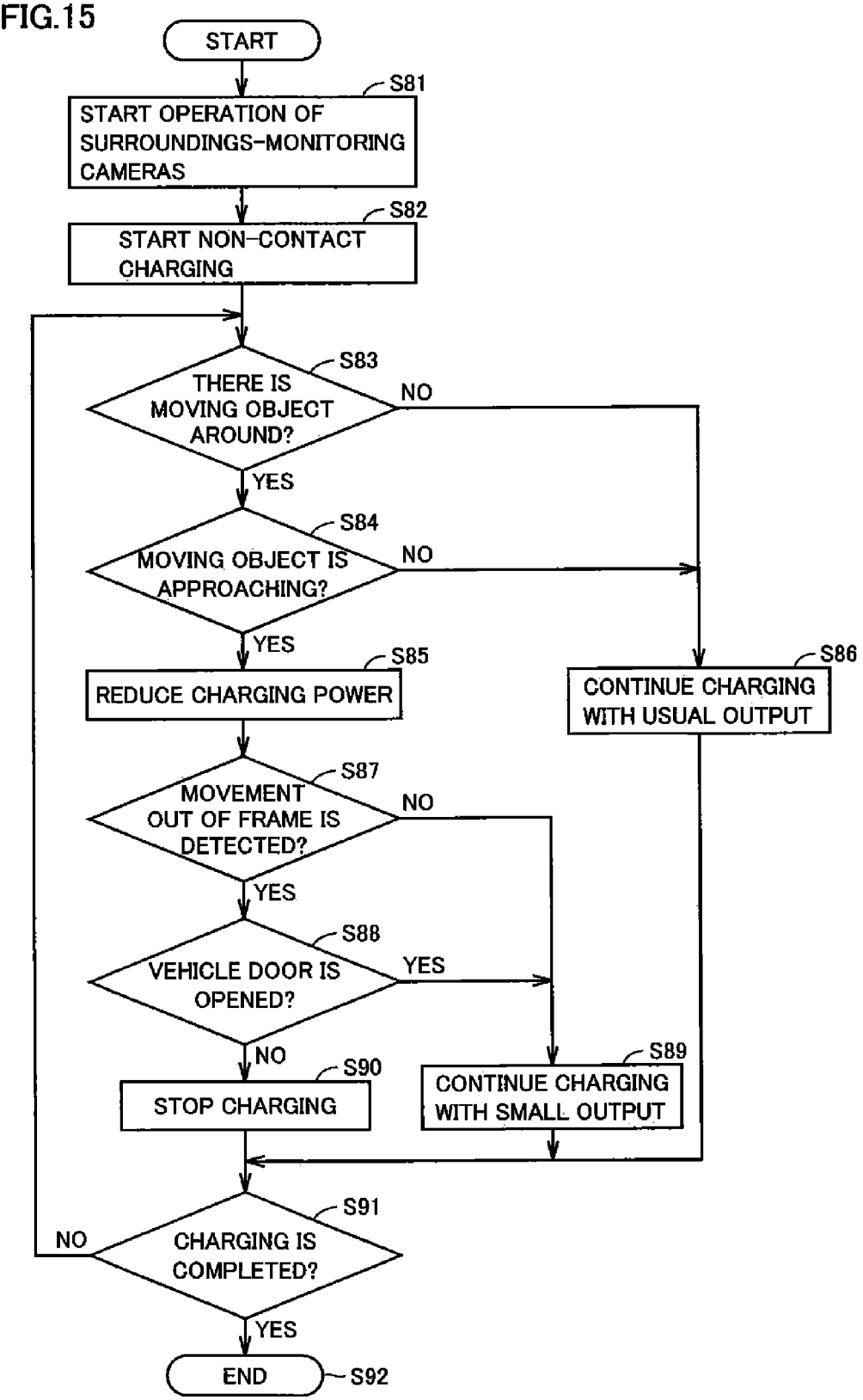
FIG. 15 is a flowchart for illustrating control performed in a second modification of the second embodiment.

FIG. 15 is a flowchart for illustrating control performed in a second modification of the second embodiment.

Referring to FIGS. 11 and 15, first, when a charging process is started upon pushing of power feed button 122 of the vehicle shown in FIG. 6 and completion of the position adjustment, in step S81, monitoring ECU 256 causes cameras 251 to 254 for monitoring the surroundings to start operation. Then, in step S82, non-contact charging is started. Then, in step S83, monitoring ECU 256 determines whether or not there is a moving object around vehicle 100A by regularly acquiring images captured by cameras 251 to 254 and taking the difference between the images.

If it is determined in step S83 that there is no moving object, the process proceeds to step S86 where the charging with usual output is continued. If it is determined in step S83 that there is a moving object, on the other hand, the process proceeds to step 84.

In step S84, monitoring ECU 256 determines whether or not the moving object is approaching. The direction of movement of the moving object can be determined from the difference between the images. If the moving object is approaching, the size of the object detected from the difference gradually increases.

If it is determined in step S84 that the moving object is not approaching, the process proceeds to step S86 where the charging with usual output is continued. If it is determined in step S84 that the moving object is approaching, on the other hand, the process proceeds to step S85.

In step S85, monitoring ECU 256 causes a reduction in charging power from power transmitting apparatus 200A. This reduction in charging power may be stopping of the charging. Then, in step S87, monitoring ECU 256 determines whether or not the moving object has moved out of the frame, that is, whether or not the moving object has disappeared from monitored region 400A shown in FIG. 12.

If it is detected in step S87 that the moving object has moved out of the frame, the process proceeds to step S88. If it is not detected that the moving object has moved out of the frame, the process proceeds to step S89.

In step S88, monitoring ECU 256 determines whether or not a vehicle door has been opened. Whether or not a vehicle door has been opened can be sensed by the movement of a portion of vehicle 100A in the images captured by cameras 251 to 254. It is to be noted that information that a vehicle door has been opened may be detected in vehicle 100A by door opening/closing detection switch 123, and may be obtained through communication unit 240. The processing of step S88 determines whether or not the moving object that moved out of the frame has entered the interior of the vehicle.

If it is detected in step S88 that a vehicle door has been opened, the process proceeds to step S89. If it is not detected in step S88 that a vehicle door has been opened, on the other hand, the process proceeds to step S90. If the process proceeds to step S90, there is a possibility that the moving object has entered the blind spot in the monitored area, and thus monitoring ECU 256 commands high-frequency power supply device 210 to stop the charging, by way of precaution. If the process proceeds to step S89, it is considered that the distance to power transmission unit 220 is still secured, and thus the charging with small output is continued.

Following the processing in step S86 or step S89 or step S90, in step S91, monitoring ECU 256 determines whether or not the charging of power storage device 150 has been completed. This determination is made based on information obtained through communication unit 240, such as information indicating whether or not the state of charge SOC of power storage device 150 has reached a target value, and information indicating whether or not a scheduled period of charging time has elapsed.

If it is determined in step S91 that the charging has been completed, the charging process ends in step S92. If the charging has not been completed, the process returns to step S83. In this case, the process proceeds to step S86 if the moving object is no longer detected around the vehicle, and the charging with usual output is resumed.

In this manner, according to the second modification of the second embodiment, the transmitted power is reduced if the moving object is approaching, whereas the usual charging is performed if the moving object is moving away. In addition, if there is a high possibility that the moving object has entered the blind spot in the monitored area, power transmitting apparatus 200A is caused to stop the power transmission by way of precaution. Accordingly, the period of charging time is likely to be shortened, and a possibility of adverse effect on equipment and the like due to the power transmission is further reduced, in addition to the effect produced in the second embodiment.

Other Modifications of Monitoring Device of Moving Object

Figure 16:
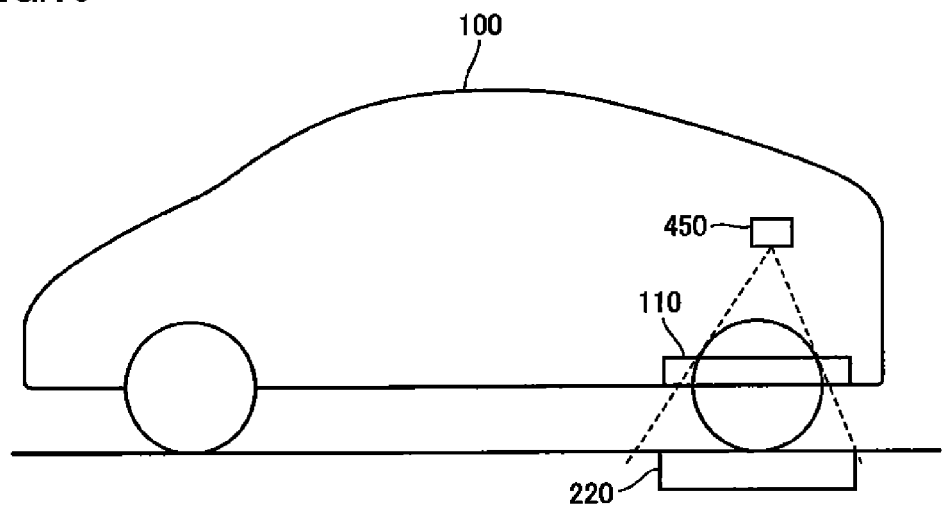
FIG. 16 is a diagram for illustrating a first modification of a monitoring device of a moving object.

FIG. 16 is a diagram for illustrating a first modification of the monitoring device of a moving object. As shown in FIG. 16, a thermo camera 450 may be provided on a side of vehicle 100 to detect the approach of a moving object to the vicinity of power transmission unit 220 and power reception unit 110. It is to be noted that thermo camera 450 is not necessarily required to be provided on the vehicle side, but may be arranged in such a manner as cameras 251 to 254 installed in the parking space as was described with reference to FIG. 12.

Thermo camera 450 may be used in place of, or in combination with, the monitoring cameras and the like in the first or second embodiment.

Figure 17:
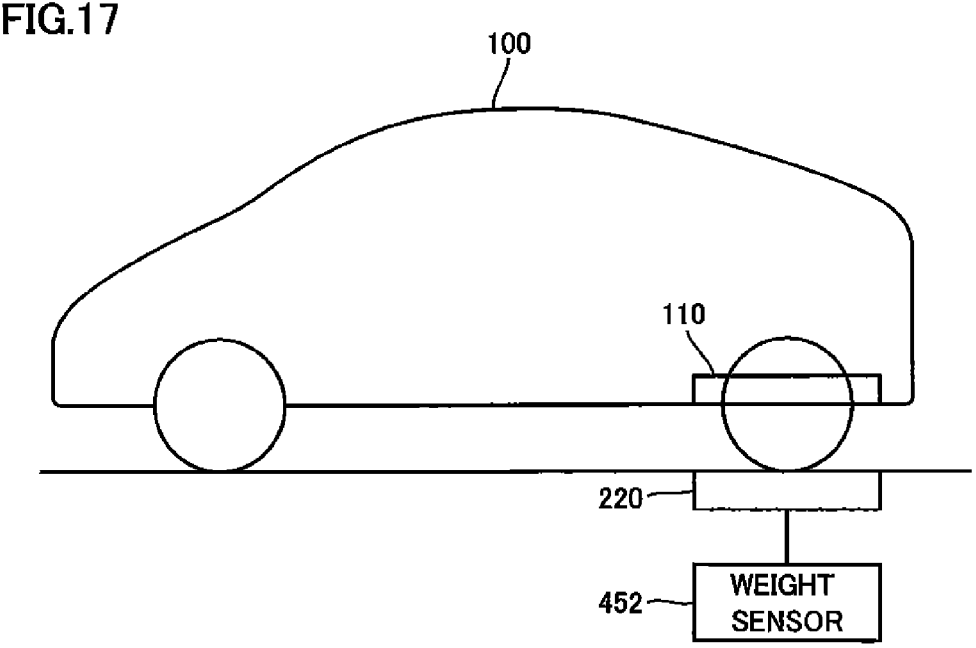
FIG. 17 is a diagram for illustrating a second modification of a monitoring device of a moving object.

FIG. 17 is a diagram for illustrating a second modification of the monitoring device of a moving object. As shown in FIG. 17, a weight sensor 452 is installed in the vicinity of power transmission unit 220. When a moving object rests on power transmission unit 220, a variation in weight is detected by weight sensor 452. It is to be noted that the weight sensor may be installed to detect a variation in weight of a region around the vehicle larger than power transmission unit 220.

Weight sensor 452 may be used in place of, or in combination with, the monitoring cameras and the like in the first or second embodiment.

It is to be noted that, while FIGS. 2, 5, 6, 11 and the like of these embodiments show examples including the primary self-resonant coil, the primary coil, the secondary self-resonant coil and the secondary coil, the present invention is not restricted to such configuration. A configuration where the power transmission between the secondary self-resonant coil and the secondary coil and the power transmission between the primary coil and the primary self-resonant coil is not performed by electromagnetic induction is also applicable. That is, any configuration may be used that employs resonance for power transmission to and power reception in a vehicle. A configuration without a coil for power transmission and reception by electromagnetic induction on a path for power transmission and reception by resonance is also applicable.

It should be understood that the embodiments disclosed herein are illustrative and non-restrictive in every respect. The scope of the present invention is defined by the terms of the claims, rather than the description above, and is intended to include any modifications within the scope and meaning equivalent to the terms of the claims.

REFERENCE SIGNS LIST 10 non-contact power transmitting and receiving system; 100, 100A vehicle; 110 power reception unit; 111 capacitor; 112, 340 secondary self-resonant coil; 113, 146 relay; 114, 350 secondary coil; 120F, 120R, 121R, 121L, 251 to 254 camera; 122 power feed button; 123 door opening/closing detection switch; 125 weight detection sensor; 130, 240 communication unit; 140 rectifier; 142 charger; 144 resistor; 150 power storage device; 162 boost converter; 164, 166 inverter; 172, 174 motor generator; 176 engine; 177 power split device; 178 drive wheel; 180 control device; 190 receiving voltage measurement unit; 200, 200A power transmitting apparatus; 210 high-frequency power supply device; 220 power transmission unit; 310 high-frequency power supply; 320 primary coil; 330 primary self-resonant coil; 360 load; 400, 400A, 420R monitored region; 430, 430A moving object; 450 thermo camera; 452 weight sensor; PL2 positive electrode line; SMR1, SMR2 system main relay.

The invention claimed is:

1. A non-contact power receiving apparatus comprising:
a power reception unit that receives electric power in a non-contact manner transmitted from a power transmitting apparatus external to a vehicle;
a control device that controls the transmitted power from the power transmitting apparatus, the control device controlling the transmitted power based on (i) a monitoring result obtained by monitoring surroundings of the vehicle, and (ii) an occupant detection result obtained by detecting whether or not an occupant enters the vehicle;
a monitoring unit that monitors a monitored region around the vehicle and outputs the monitoring result to the control device; and
a vehicle entry detection unit that detects whether or not the occupant enters the vehicle, wherein
after an approach of a moving object to the vehicle is detected based on an output from the monitoring unit, when it is detected that the moving object has moved to a non-monitored region, the control device detects whether or not the occupant enters the vehicle with the vehicle entry detection unit.

2. The non-contact power receiving apparatus according to claim 1, wherein
when the monitoring result of the monitoring unit indicates the approach of the moving object to the vehicle, the control device causes the power transmitting apparatus to reduce the transmitted power.

3. The non-contact power receiving apparatus according to claim 1, wherein
after the approach of the moving object to the vehicle is detected, when it is detected that the moving object has moved to the non-monitored region, the control device causes the power transmitting apparatus to continue power transmission if it is detected that the occupant has entered the vehicle, and causes the power transmitting apparatus to stop the power transmission if it is not detected that the occupant has entered the vehicle.

4. The non-contact power receiving apparatus according to claim 1, wherein
the monitoring unit is a camera that acquires an image of the monitored region, a thermo camera that acquires a temperature of the monitored region, or a monitoring device that detects the presence or absence of the moving object in the monitored region by one of ultrasound, electric wave, light, and a variation in weight, and
the vehicle entry detection unit detects at least one of opening/closing of a door of the vehicle and a variation in weight of the vehicle.

5. The non-contact power receiving apparatus according to claim 1, wherein
the power transmitting apparatus and the power reception unit transmit and receive electric power in a non-contact manner by electromagnetic field resonance.

6. A non-contact power transmitting apparatus comprising:
a power transmitting apparatus that transmits electric power in a non-contact manner to a power reception unit of a vehicle;
a control device that controls the transmitted power from the power transmitting apparatus, the control device controlling the transmitted power based on (i) a monitoring result obtained by monitoring surroundings of the vehicle, and (ii) an occupant detection result obtained by detecting whether or not an occupant enters the vehicle; and a monitoring unit that monitors a monitored region around the vehicle and outputs the monitoring result to the control device, wherein after an approach of a moving object to the vehicle is detected based on an output from the monitoring unit, when it is detected that the moving object has moved to a non-monitored region, the control device detects whether or not the occupant enters the vehicle with the monitoring unit.

7. The non-contact power transmitting apparatus according to claim 6, wherein when the monitoring result of the monitoring unit indicates the approach of the moving object to the vehicle, the control device causes the power transmitting apparatus to reduce the transmitted power.

8. The non-contact power transmitting apparatus according to claim 6, wherein after the approach of the moving object to the vehicle is detected, when it is detected that the moving object has moved to the non-monitored region, the control device causes the power transmitting apparatus to continue power transmission if it is detected that the occupant has entered the vehicle, and causes the power transmitting apparatus to stop the power transmission if it is not detected that the occupant has entered the vehicle.

9. The non-contact power transmitting apparatus according to claim 6, wherein the monitoring unit is a camera that acquires an image of the monitored region, a thermo camera that acquires a temperature of the monitored region, or a monitoring device that detects the presence or absence of the moving object in the monitored region by one of ultrasound, electric wave, light, and a variation in weight.

10. The non-contact power transmitting apparatus according to claim 6, wherein the power transmitting apparatus and the power reception unit transmit and receive electric power in a non-contact manner by electromagnetic field resonance.

11. A non-contact power transmitting and receiving system comprising:

a power transmitting apparatus external to a vehicle;

a power reception unit mounted on the vehicle that receives electric power transmitted in a non-contact manner from the power transmitting apparatus;

a control device that controls the transmitted power from the power transmitting apparatus, the control device controlling the transmitted power based on (i) a monitoring result obtained by monitoring the surroundings of the vehicle, and (ii) an occupant detection result obtained by detecting whether or not an occupant enters the vehicle;

a monitoring unit that monitors a monitored region around the vehicle and outputs the monitoring result to the control device; and a vehicle entry detection unit that detects whether or not the occupant enters the vehicle, wherein after an approach of a moving object to the vehicle is detected based on an output from the monitoring unit, when it is detected that the moving object has moved to a non-monitored region, the control device detects whether or not the occupant enters the vehicle with the vehicle entry detection unit.

12. The non-contact power transmitting and receiving system according to claim 11, wherein when the monitoring result of the monitoring unit indicates the approach of the moving object to the vehicle, the control device causes the power transmitting apparatus to reduce the transmitted power.

13. The non-contact power transmitting and receiving system according to claim 11, wherein the power transmitting apparatus and the power reception unit transmit and receive electric power in a non-contact manner by electromagnetic field resonance.

* * * * *